US010698394B2

(12) United States Patent
Bradbury et al.

(10) Patent No.: US 10,698,394 B2
(45) Date of Patent: *Jun. 30, 2020

(54) ENHANCED SERVICE PROCEDURES USING FORCE MEASUREMENT

(71) Applicant: INTERNATIONAL BUSINESS MACHINES CORPORATION, Armonk, NY (US)

(72) Inventors: Jonathan D. Bradbury, Poughkeepsie, NY (US); Jonathan R. Fry, Fishkill, NY (US); Michael R. Kane, Hopewell Junction, NY (US); Jeffrey Nettey, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/842,974

(22) Filed: Dec. 15, 2017

(65) Prior Publication Data

US 2018/0364691 A1    Dec. 20, 2018

Related U.S. Application Data

(63) Continuation of application No. 15/623,934, filed on Jun. 15, 2017, now Pat. No. 10,545,493.

(51) Int. Cl.
*G05B 23/00*  (2006.01)
*G01L 5/00*   (2006.01)
*G05B 23/02*  (2006.01)

(52) U.S. Cl.
CPC ............ *G05B 23/00* (2013.01); *G01L 5/0061* (2013.01); *G05B 23/0267* (2013.01)

(58) Field of Classification Search
CPC ..... G05B 23/00; G05B 23/0267; G01L 5/006; G01L 5/0061
See application file for complete search history.

(56) References Cited

U.S. PATENT DOCUMENTS

| 6,993,456 B2 * | 1/2006 | Brooks ................ G05B 19/409 |
| | | 702/183 |
| 7,614,148 B2 | 11/2009 | Chamberlain |

(Continued)

FOREIGN PATENT DOCUMENTS

| CN | 101477488 A | 7/2009 |
| CN | 205593671 U | 9/2016 |
| KR | 101644457 B1 | 8/2016 |

OTHER PUBLICATIONS

Bradbury et al., "Enhanced Service Procedures Using Force Measurement", U.S. Appl. No. 15/623,934, filed Jun. 15, 2017.

(Continued)

*Primary Examiner* — Bryan Bui
(74) *Attorney, Agent, or Firm* — Anthony M. Pallone (57) ABSTRACT

An embodiment of the invention may include a method, computer program product and system for guided service procedure. The embodiment may include receiving feedback data from one or more of a plurality of sensors. Each of the plurality of sensors may detect a physical condition at a serviceable location within an item of equipment. The item of equipment may be undergoing a service procedure by an equipment servicer. The embodiment may include determining whether the received feedback data from one or more of the plurality of sensors exceeds a threshold value. Based on determining that the threshold value is exceeded, the embodiment may include alerting the equipment servicer during the service procedure.

6 Claims, 6 Drawing Sheets

(56) References Cited

U.S. PATENT DOCUMENTS

| | | |
|---|---|---|
| 8,373,959 B2 | 2/2013 | Kuczynski et al. |
| 2004/0138920 A1 | 7/2004 | Sawanaga |
| 2013/0065428 A1 | 3/2013 | Steeves |
| 2016/0070614 A1 | 3/2016 | Joshi et al. |
| 2016/0071183 A1 | 3/2016 | Joshi |
| 2016/0334301 A1 | 11/2016 | Hafenrichter et al. |
| 2016/0342155 A1 | 11/2016 | Boyd et al. |

OTHER PUBLICATIONS

Bradbury et al., "Enhanced Service Procedures Using Force Measurement", U.S. Appl. No. 15/855,218, filed Dec. 27, 2017.

List of IBM Patents or Patent Applications Treated as Related. Filed Dec. 27, 2017. 2 pages.

AR-Media, "I-Mechanic, the AR App that turns yourself into a Mechanic", http://www.armedia.it/i-mechanic.com, Printed on Jun. 2, 2017, 12 pages.

Nguyen, et al., "Insertion Force Sensor by Sidewall-Doping with Rapid Thermal Diffusion", Department of Mechano-Informatics, Graduate School of Information Science and Technology, Jan. 2006, 4 Pages , MEMS 2006, Istanbul Turkey.

Mell et al., "The NIST Definition of Cloud Computing", NIST, Sep. 2011, 7 Pages, Special Publication 800-145, U.S. Department of Commerce, Gaithersburg, MD.

\* cited by examiner

ENHANCED SERVICE PROCEDURES USING FORCE MEASUREMENT

BACKGROUND

The present invention relates to a system for servicing equipment, and more specifically, to detecting physical conditions of components within equipment.

The use of items of equipment is widespread across many industries and entities including commercial businesses, consumer businesses, and the government. Implementing proper service procedures for an item of equipment may help to promote the correct and intended operation of the serviced equipment. The knowledge of the technician performing the service and their awareness of the physical condition of components within an item of equipment may also influence the quality and outcome of the service procedure.

BRIEF SUMMARY

An embodiment of the invention may include a method, computer program product and system for guided service procedure. The embodiment may include receiving feedback data from one or more of a plurality of sensors. Each of the plurality of sensors may detect a physical condition at a serviceable location within an item of equipment. The item of equipment may be undergoing a service procedure by an equipment servicer. The embodiment may include determining whether the received feedback data from one or more of the plurality of sensors exceeds a threshold value. Based on determining that the threshold value is exceeded, the embodiment may include alerting the equipment servicer during the service procedure.

DETAILED DESCRIPTION

Service procedures for enterprise computing, medical, industrial, transportation, or other specialized equipment can be very complex. Servicing such complex items of equipment can be a challenge as it may present many opportunities for faults and mistakes to occur during the service procedure which may cause equipment malfunctions and possibly dangerous situations. Malfunctions caused by, for example, accidental component damage, miss-seated connectors, or servicing an incorrect location are often not detected until a system utilizing the item of equipment is attempted to be brought to normal power or operational status. Malfunction detection at this point may result in undesirable outcomes such as, equipment damage or extended outages of equipment use, lost productivity to clients, and increased service costs to maintain equipment.

Embodiments of the present invention disclose a physical condition detection system 100, described below, which provides a method for enhancing equipment service procedures by introducing corrective steps based on feedback from a system of internal sensors which can be used to detect physical conditions at serviceable locations. In embodiments of the invention, serviceable locations may include, for example, power supplies, cable connectors, printed circuit board ("PCB") connectors, computer hardware components, or other electrical and mechanical components within an item of equipment. In other embodiments, serviceable locations may include, for example, surfaces for which deflection can be measured and non-electrical connections such as a chassis frame. The feedback from the system of sensors may be used to monitor and correct a variety of situations. For example, if forces are detected in unexpected connector locations, or forces are out of acceptable tolerance limits for a given connector, service procedures could be amended in real time to prompt the servicer to inspect for damage or take appropriate corrective action. Furthermore, in another example, unexpected forces detected while an item of equipment is in normal run-time operation could be recorded, used to trigger warnings, and aid in debugging the item of equipment at a later date.

Embodiments of the present invention will now be described in detail with reference to the accompanying Figures.

Figure 1:
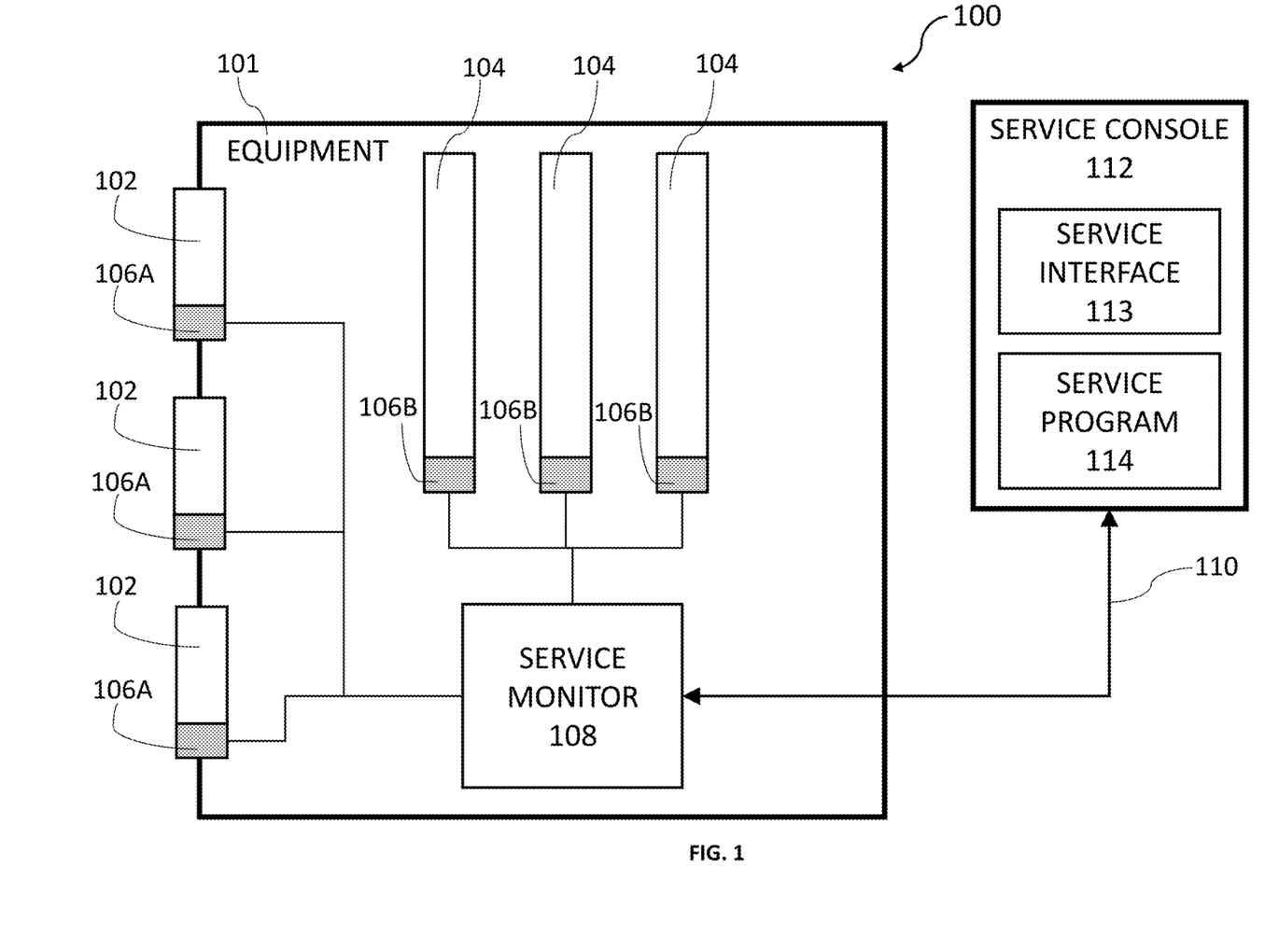
FIG. 1 is a block diagram illustrating a physical condition detection system, in accordance with an embodiment of the present invention.

FIG. 1 is a functional block diagram illustrating physical condition detection system 100, in accordance with an embodiment of the present invention. In an example embodiment, physical condition detection system 100 may include equipment 101, console connector 110, and service console 112.

In an example embodiment, equipment 101 represents a platform to house physical condition detection system 100. Equipment 101 may be any item of specialized equipment used, for example, in a commercial, consumer, government, or public setting. Equipment 101 may include one or more input/output connectors 102, one or more card connectors 104, one or more sensors 106A, one or more sensors 106B, and service monitor 108. In various other embodiments, equipment 101 may include a piece of complex manufacturing/assembly line equipment or a piece of complex medical equipment, such as an MRI machine. Additionally, in various other embodiments, equipment 101 may include commercial, industrial, aviation, or marine equipment.

In embodiments of the invention, input/output connector 102 represents an electrical connector through which input and output devices may be connected to equipment 101. In various embodiments, input/output connector 102 may be, for example, a power connectors, a pc card adapter, an IBM GX adapter, an audio connector, a video connector, a modem, an Ethernet port, an infrared connector, a USB, a serial connector, a parallel connector, fire wire, a WiFi connector, or any other input/output connector known in the industry. In an example embodiment, three input/output connectors 102 are depicted, however, equipment 101 is not limited to three input/output connectors 102. In an example embodiment, one input/output connector 102 may be a USB port, another input/output connector 102 may be an HDMI port, and yet another input/output connector 102 may be an Ethernet port.

In embodiments of the invention, card connector 104 represents an electrical connector into which a printed circuit board can be inserted to add functionality to equipment 101. In various embodiments, card connector 104 may be, for example, a peripheral component interconnect ("PCI") slot, an accelerated graphics port ("AGP"), memory connectors, or any other electrical connector for PCBs known in the industry. In various other embodiments, card connector 104 may represent a bridge between critical components, rather than optional peripheral components. For example, in a cell phone with multiple printed circuit boards connected by ribbon connectors. In an example embodiment, three card connectors 104 are depicted, however, equipment 101 is not limited to three card connectors 104. In an example embodiment, one card connector 104 may be a slot for RAM, another card connector 104 may be a PCI slot, and yet another card connector 104 may be another PCI slot.

In embodiments of the invention, sensors 106A-B may monitor and detect physical conditions at serviceable locations within equipment 101. Serviceable locations within equipment 101 may be, for example, mechanical connector locations, such as input/output connector 102 and card connector 104. Serviceable locations within equipment 101 may also include non-electrical connections. In various embodiments, sensors 106A-B may send back an analog signal representing a physical condition (e.g. pressure, force, voltage) and/or a discrete signal (e.g. proper connection, pressure switch) at serviceable locations within equipment 101. Sensors 106A-B may also detect plugs/unplugs at serviceable locations within equipment 101. Sensors 106A-B may be mechanical, electrical, optical, or based on any other sensor design known in the industry for detecting physical conditions and providing feedback. In various embodiments, sensors 106A-B may include, for example, a strain gauge mounted on a flat surface to measure deflection of that surface. Further examples may include a capacitive, acoustic, or optical sensor could measure the distance between two points to check for deflection, and an optical sensor could check for alignment. In an example embodiment, one or more of sensors 106A-B may transmit feedback to service monitor 108 upon detection of some predefined physical condition or force at one or more serviceable locations within equipment 101. In an example embodiment, sensor 106A may monitor physical conditions at one or more input/output connectors 102 and sensor 106B may monitor physical conditions at one or more card connectors 104.

In embodiments of the invention, service monitor 108 may monitor feedback from one or more sensors within equipment 101 and communicate sensor feedback to service console 112. In an example embodiment, service monitor 108 may be a microprocessor programmed to monitor feedback from sensors 106A-B, located at various serviceable locations within equipment 101. Service monitor 108 may also be programmed to transmit, via some connection, feedback from sensors 106A-B to service console 112. Furthermore, service monitor 108, may be programmed to receive data or commands from service console 112. In an example embodiment, service monitor 108 may monitor and receive feedback from sensors 106A-B relating to the physical condition of serviceable locations within equipment 101. Service monitor 108 may also transmit, over console connector 110, the received sensor feedback to service console 112.

In embodiments of the invention, console connector 110 represents a means for connection and transmission of sensor feedback data from sensors within equipment 101, to service console 112. In an embodiment, console connector 110 may be implemented with any architecture designed for passing data and/or control information between processors (such as microprocessors) and peripheral devices. In another embodiment, console connector 110 may be a coaxial cable, fiber optic cable, twisted pair cable, Ethernet cable or any other type of cable for sending and receiving information across a network. In an example embodiment, console connector 110 transmits sensor feedback data from service monitor 108 to service console 112.

In yet another embodiment, console connector 110 may be implemented through a network, such as the Internet, representing a worldwide collection of networks and gateways to support communications between devices connected to the Internet. The network may include, for example, wired, wireless or fiber optic connections. In other embodiments, console connector 110 may be implemented as an intranet, a local area network (LAN), or a wide area network (WAN). In general, console connector 110 can be any combination of connections and protocols that will support communications between equipment 101 and service console 112.

In embodiments of the invention, service console 112 represents a means for displaying information from one or more sensors, within equipment 101, to an equipment servicer. Service console 112 may include service interface 113 and service program 114. Service console 112 may be implemented as a hardware management console, a desktop computer, a notebook or a laptop computer, a smart phone, a tablet computer, a handheld device, a thin client, or any other electronic device or computing system known in the art, in accordance with embodiments of the present invention, and may each include internal and external hardware components, as depicted in further detail below with reference to FIG. 4. Service console 112 may also be capable of hosting service interface 113 and service program 114 and of sending and receiving data to and from equipment 101, through console connector 110. In an example embodiment, service console 112 may display data received from service monitor 108, via console connector 110. The received data may contain information from sensors 106A-B located within equipment 101. Furthermore, in an example embodiment, service console 112 may also display suggested action in response to the received data.

In embodiments of the invention, service interface 113 includes components used to relay information to a user of service console 112, as well as receive input from a user and transmit the input to an application residing on service console 112. In an example embodiment, service interface 113 uses a combination of technologies and devices, such as device drivers, to provide a platform to enable users of service console 112 to interact with service program 114. In the example embodiment, service interface 113 receives input from a physical input device, such as a touch screen or keyboard, via a device driver that corresponds to the physical input device. In an example embodiment, service interface 113 displays information from service program 114 to a user through a display.

In embodiments of the invention, service program 114 may interpret sensor data in accordance with embodiments of the physical condition detection system of FIG. 1. Service program 114 may be a software application or configuration in a software application capable of interpreting data received from one or more of sensors 106A-B located at serviceable locations within equipment 101. In an example embodiment, service program 114 may interpret sensor data received by service console 112, through console connector 110. The received data may originate from one or more of sensors 106A-B and relate to detected forces or physical conditions at one or more of input/output connectors 102 and one or more card connectors 104, within equipment 101. In another embodiment, service program 114 may be located on equipment 101. The operations and functions of service program 114 are described in further detail below with regard to FIGS. 2 and 3.

Figure 2:
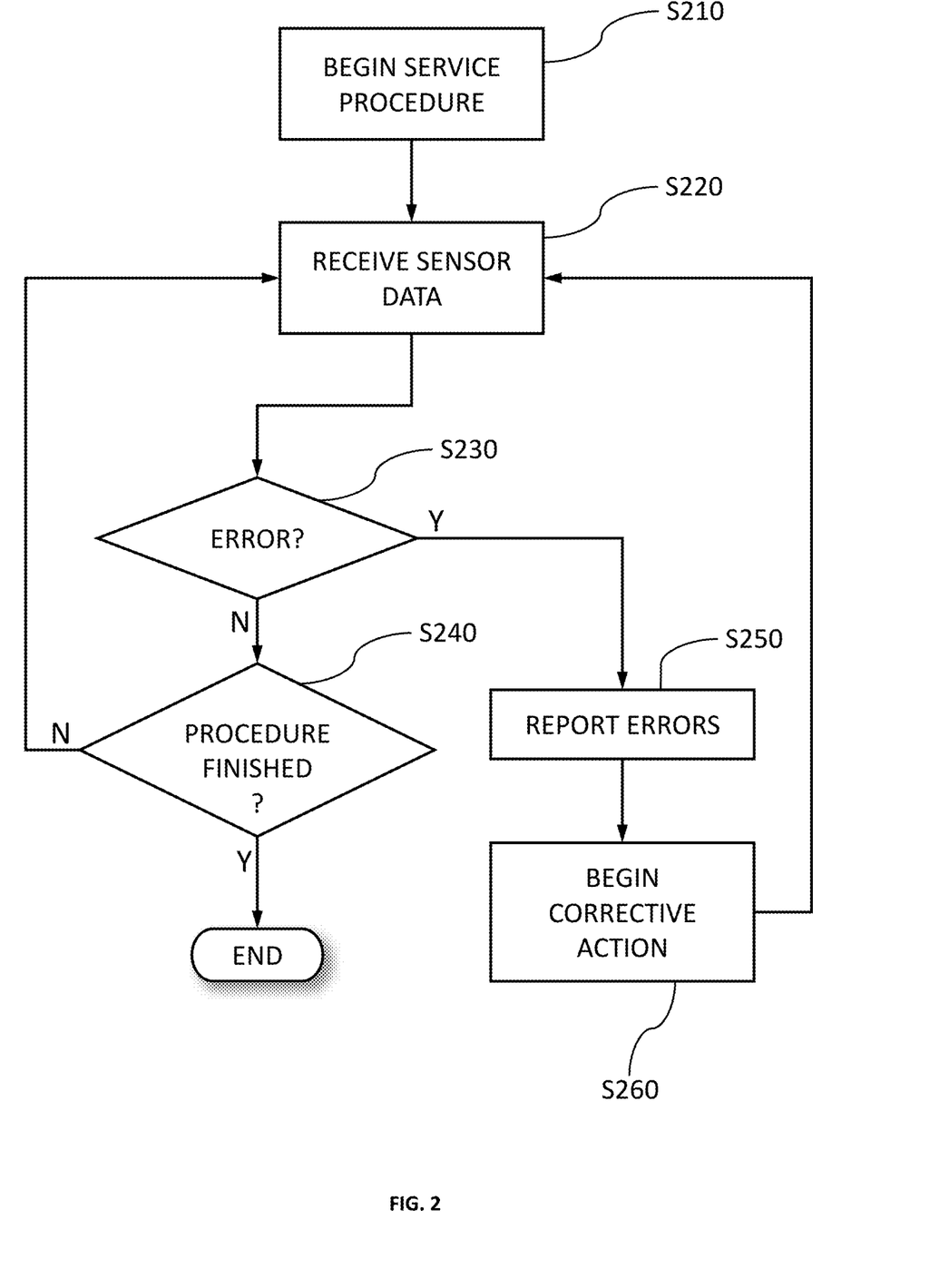
FIG. 2 is a flowchart illustrating the operations of the service console of FIG. 1, in accordance with an embodiment of the invention where the physical condition detection system of FIG. 1 is active during a service procedure.

FIG. 2 shows a flowchart illustrating the operations of service program 114 in accordance with an example embodiment of the invention where the physical condition detection system of FIG. 1 is active during a service procedure. Referring to step S210, an equipment servicer may begin a service procedure on components, such as one or more input/output connector 102 and one or more card connectors 104, within equipment 101. In one embodiment, before an equipment servicer can begin a service procedure on components within equipment 101, the equipment servicer may first need to remove or open a service panel to expose the serviceable locations. An electrical switch may be connected to a latch of the service panel. Upon removal or opening of the service panel, an electrical signal is sent to service program 114 to indicate that a service procedure is active. In an example embodiment, an equipment servicer may, upon initiation of a service procedure, set the service status of equipment 101 as active by turning on a service status indicator within service program 114.

Referring to step S220, service program 114 may receive sensor data from equipment 101, while equipment 101 is undergoing a service procedure. The received data may include information from one or more of sensors 106A-B, located at serviceable locations, such as input/output connector 102 and card connector 104, within equipment 101. Service monitor 108, located within equipment 101, may monitor and collect the feedback data from sensors 106A-B for transmission to service program 114, via console connector 110.

Referring to step S230, service program 114 may determine whether an error exists at a serviceable location within equipment 101, based on the received sensor data corresponding to the serviceable location. In an example embodiment, an error may exist at a serviceable location if the sensor associated with that location detects an unexpected force or detects a force which exceeds an accepted predetermined tolerance value, defined by service program 114. If an error exists at the serviceable location, service program 114 proceeds to step S250. If an error does not exist at the serviceable location, service program 114 proceeds to step S230. In another embodiment, an error may exist at one or more serviceable locations within equipment 101, if the feedback from multiple sensors satisfies a multi-sensor consensus indicating an unexpected force, or if the combined feedback from multiple sensors exceeds a predetermined threshold or tolerance value. For example, if three of four pressure sensors detected an unexpected force at serviceable locations within equipment 101.

Referring to step S240, service program 114 may determine whether or not the service procedure is finished. The determination of whether the service procedure is finished may be made via a servicer input, or using additional sensors in equipment 101. In one embodiment, the status of the service procedure may be determined by an electrical switch connected to a latch of a service panel on equipment 101. Once a removed or opened service panel has been replaced or closed, the electrical signal indicating an service procedure may be terminated. In an example embodiment, the status of the service procedure may be determined by a service status indicator within service program 114. Upon completion of a service procedure, the equipment servicer may then use service program 114 to turn the service status indicator off. If the service status indicator is on, service program 114 may determine that the service procedure is not finished and return to step S210.

Referring to step S250, service program 114 may report the error to the equipment servicer. Service program 114 may also log the error made during the service procedure for future use in debugging or investigation into other problems that may arise in equipment 101.

Referring to step S260, service program 114 may amend the service procedure in real time to ask the equipment servicer to confirm that a previous step was completed correctly, inspect the serviceable location for damage, or to take some other corrective action. For example, if service program 114 reports to the equipment servicer that a force exceeding some threshold value was detected at card connector 104, service program 114 may then ask the equipment servicer to inspect card connector 104 for damage. Once corrective action has been presented to the equipment servicer, service program 114 proceeds to step S210.

Figure 3:
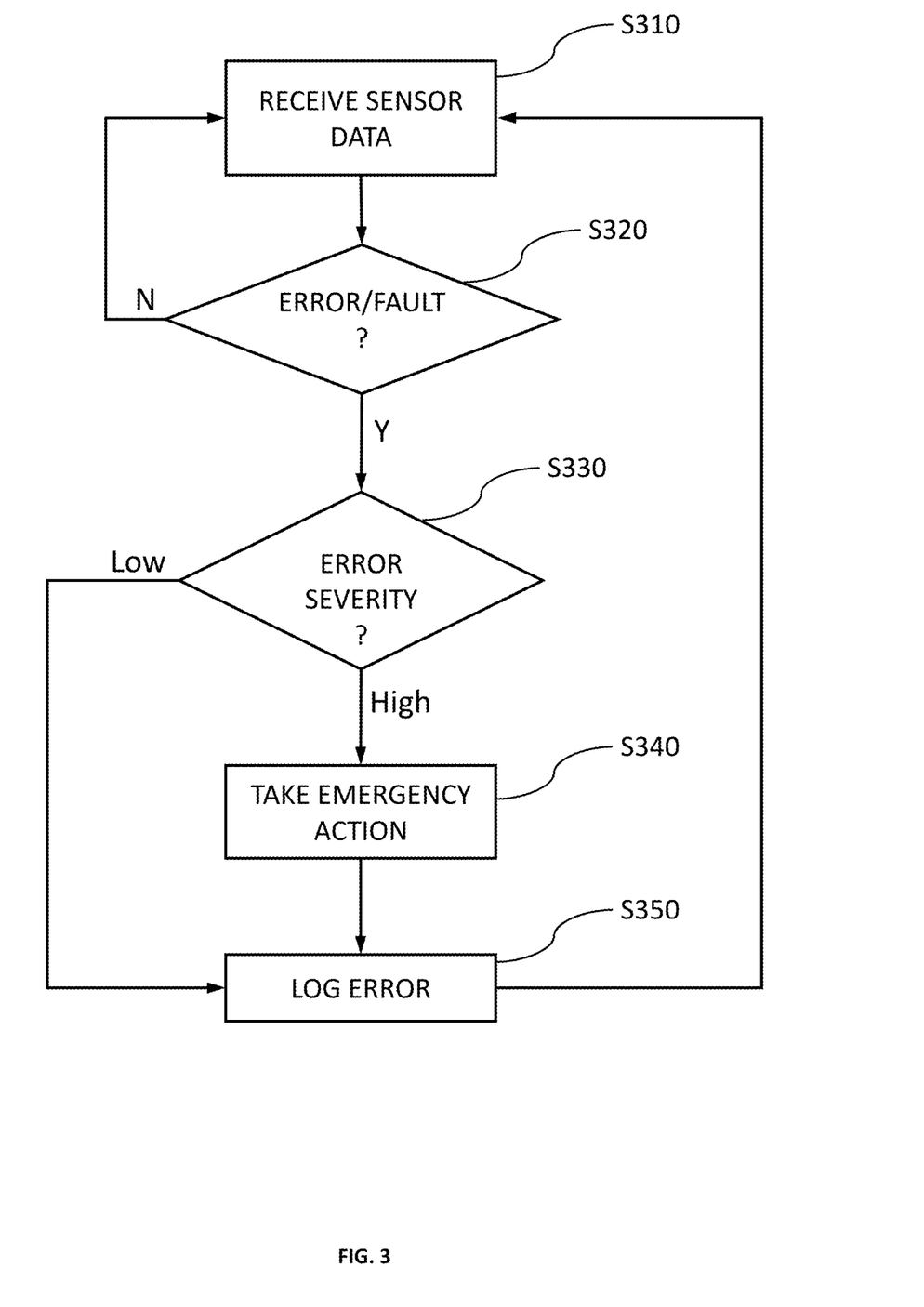
FIG. 3 is a flowchart illustrating the operations of the service console of FIG. 1, in accordance with an embodiment of the invention where the physical condition detection system of FIG. 1 is active during run-time operation.

FIG. 3 shows a flowchart illustrating the operations of service console 112 in accordance with an example embodiment of the invention where the physical condition detection system of FIG. 1 is active during run-time operation. Referring to step S310, service program 114 may receive sensor data from equipment 101, while equipment 101 is in run-time operation. The received data may include information from one or more of sensors 106A-B, located at serviceable locations, such as input/output connector 102 and card connector 104, within equipment 101. Service monitor 108, located within equipment 101, may monitor and collect the feedback data from sensors 106A-B for transmission to service program 114, via console connector 110.

Referring to step S320, service program 114 determines whether an error or fault exists at a serviceable location within equipment 101, based on the received sensor data corresponding to the serviceable location. In an example embodiment, an error or fault may exist at a serviceable location if the sensor associated with that location detects a mechanical connector disconnect, an unexpected force, or a force which exceeds an accepted predetermined tolerance value, defined by service program 114. If an error or fault exists at the serviceable location, service program 114 proceeds to step S330. If an error or fault does not exist at the serviceable location, service program 114 proceeds to step S310. In another embodiment, an error may exist at one or more serviceable locations within equipment 101, if the feedback from multiple sensors satisfies a multi-sensor consensus indicating an unexpected force, or if the combined feedback from multiple sensors exceeds a predetermined threshold or tolerance value. For example, if three of four sensors detected an unexpected force at serviceable locations within equipment 101.

Referring to step S330, service program 114 determines the severity of the error or fault detected in step S320, based on predetermined classifications, stored within service program 114, of low severity errors or faults and high severity errors or faults. For example, a high severity error or fault may occur if a PCB adding functionality to equipment 101, via card connector 104, fails or becomes disconnected. Moreover, a low severity error may occur if an output device, such as display, connected via input/output connector 102, fails or becomes disconnected. If service program 114 determines that the severity of the error or fault is high, service program 114 proceeds to step S340. If service program 114 determines that the severity of the error or fault is low, service program 114 proceeds to step S350.

Referring to step S340, service program 114 may take emergency action in response to detection of a high severity error or fault. Continuous monitoring of input/output connector 102 and card connector 104, within equipment 101, allow action to be taken during run-time operation in response to potential safety issues. In an example embodiment, detection of a high severity error or fault at a serviceable location within equipment 101 may trigger emergency action in the form of displaying a warning to a user of service program 114, flashing a warning light, or playing an audible alarm, while equipment 101 is in run-time operation. In an example embodiment, emergency action may also include the powering off of the serviceable location (e.g. input/output connector 102, card connector 104), within equipment 101, where the high severity error or fault was detected.

Referring to step S350, service program 114 may log the error or fault detected in step S330 for analysis and for future use in debugging or investigation into other problems that may arise in equipment 101. In an embodiment, service program 114 may store the logged error or fault within a database located on service console 112 and request a service procedure, performed by an equipment servicer, for the detected error in equipment 101.

In another embodiment, where the physical condition detection system of FIG. 1 is active during run-time operation, service program 114 may, separately or additionally, utilize feedback from sensors 106A-B to detect potential tampering with components at serviceable locations within equipment 101. Service monitor 108 may continuously monitor the states of one or more sensors 106A-B, within equipment 101, and transmit sensor data to service program 114, via console connector 110. If one or more of sensors 106A-B detects a force outside of what is expected during run-time operation, service program 114 may log the event for investigation and notify the system administrator responsible for operating equipment 101 of the potential need for maintenance, performed by an equipment servicer, within equipment 101.

In yet another embodiment, where the physical condition detection system of FIG. 1 is active during run-time operation, service program 114 may, separately or additionally, utilize feedback from sensors 106A-B to implement a plug odometer feature within equipment 101. Some specialized items of equipment may be designed for a limited number of service operations before sensitive connections or components wear out. In an embodiment, equipment 101 may be designed for a limited number of service operations. Service monitor 108 may continuously monitor the connection states of one or more sensors 106A-B, within equipment 101, and transmit sensor data to service program 114, via console connector 110. Each time one or more of sensors 106A-B detects a connection state in the form of a full or incomplete mechanical plug or other action at serviceable locations within equipment 101, service program 114 may increment a counter. Once the counter has reached a predetermined threshold value, service program 114 may log the event and notify an equipment servicer that a component within equipment 101 has reached the end of its service life and requires replacing.

Figure 4:
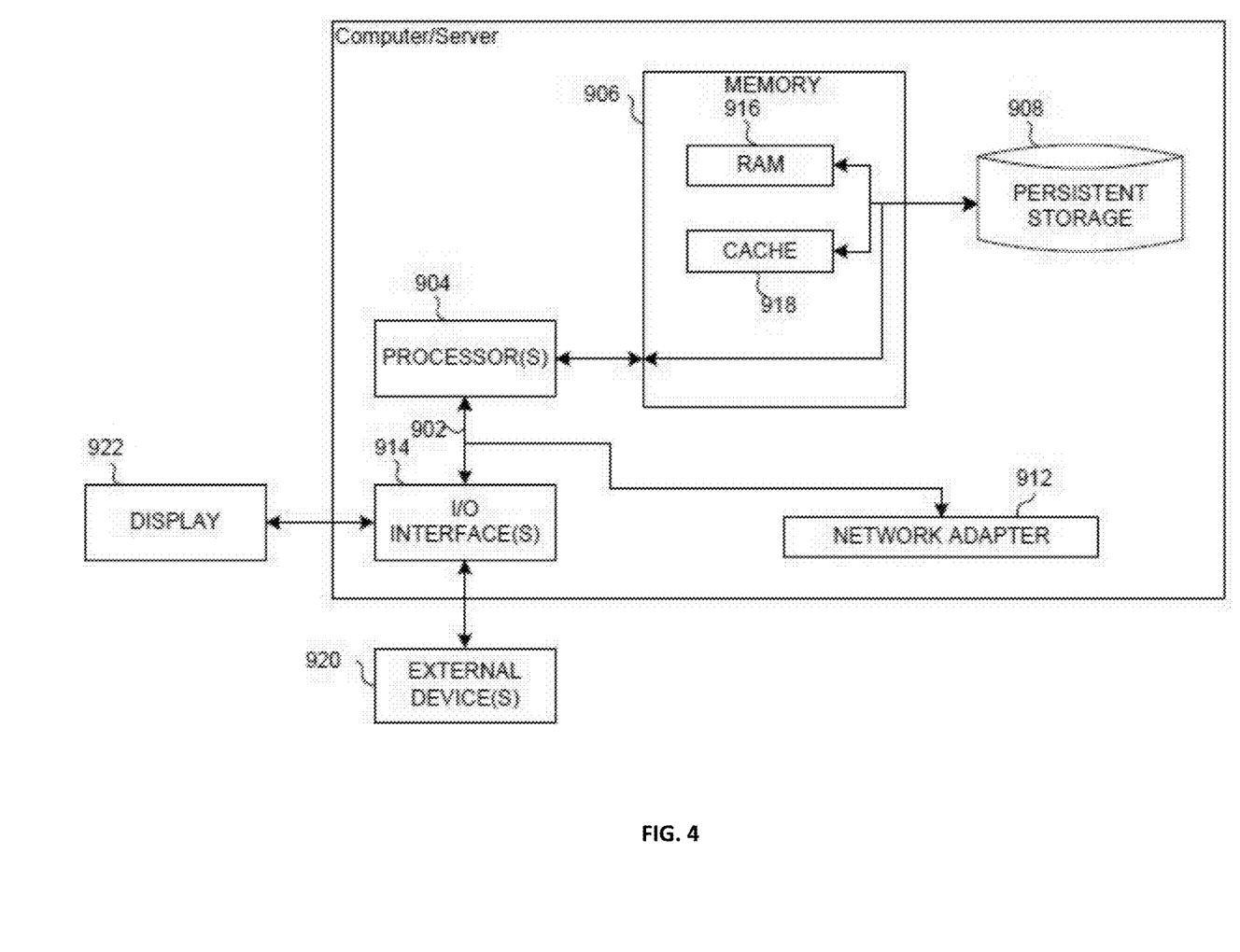
FIG. 4 is a block diagram depicting the hardware components of the physical condition detection system of FIG. 1, in accordance with an embodiment of the invention.

FIG. 4 depicts a block diagram of components of service console 112, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Service console 112 includes communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs service interface 113 and service program 114 in service console 112 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs service interface 113 and service program 114 in service console 112 is may be downloaded to persistent storage 908 through network adapter 912.

I/O interface(s) 914 allows for input and output of data with other devices that may be connected to service console 112. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs service interface 113 and service program 114 in service console 112, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
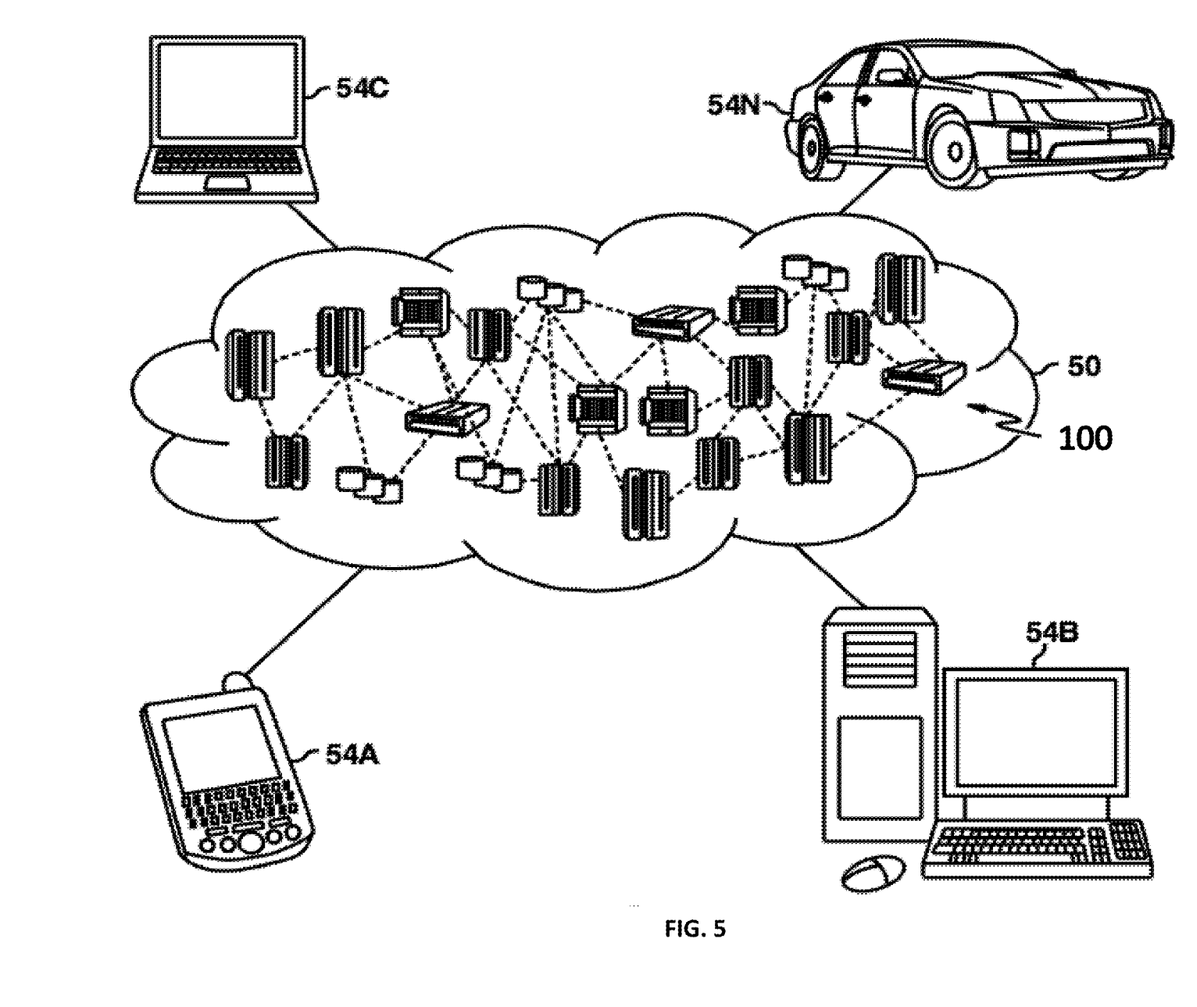
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
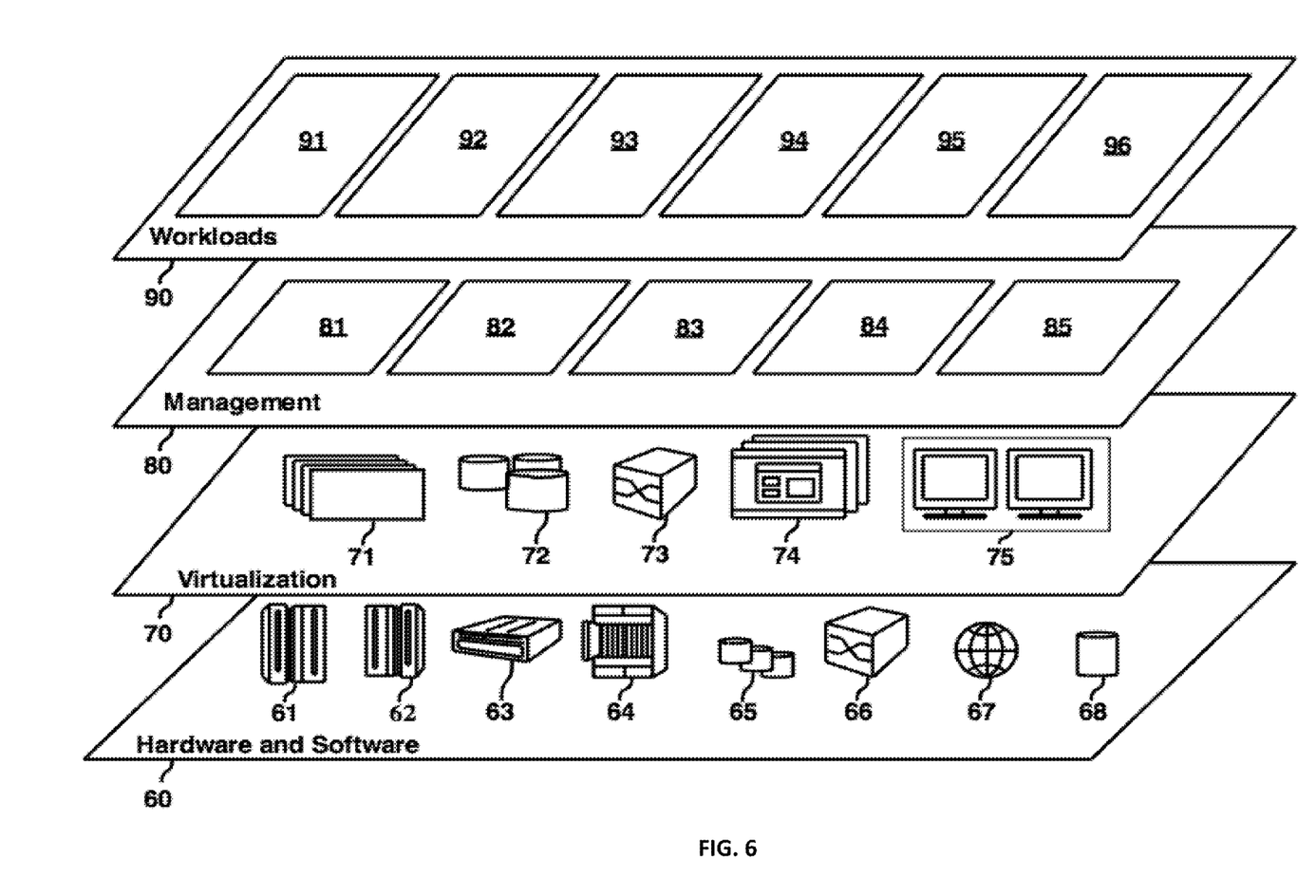
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and physical condition detection system 96. Physical condition detection system 96 may relate to monitoring sensor feedback from sensors located within an item of equipment and suggesting possible action based on the sensor feedback.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for guided service procedure, the method comprising:
receiving, from a service monitor of an item of equipment, sensor data from a plurality of sensors of the item of equipment, wherein the plurality of sensors is detecting a physical condition at a serviceable location within the item of equipment, and wherein the plurality of sensors transmits feedback data to the service monitor, and wherein the feedback data relates to detected physical conditions at serviceable locations within the item of equipment, and wherein the item of equipment is undergoing a service procedure by an equipment servicer;
determining whether the received sensor data exceeds a threshold value;
determining whether the received sensor data satisfies a consensus among the plurality of sensors indicating an unexpected force;
based on determining that the threshold value is exceeded, alerting the equipment servicer during the service procedure; and
based on determining that the consensus among the plurality of sensors indicating an unexpected force is satisfied, alerting the equipment servicer during the service procedure.

2. The method of claim 1, wherein a serviceable location within an item of equipment comprises a computer hardware component.

3. The method of claim 1, wherein a physical condition at a serviceable location comprises an element from the group consisting of: a force, an alignment, a voltage, and a connection state.

4. The method of claim 1, wherein alerting the equipment servicer comprises an element from the group consisting of: displaying corrective actions to the equipment servicer, displaying a warning to the equipment servicer, playing an audible alarm, flashing a warning light, and powering off a serviceable location.

5. The method of claim 1, further comprising:
receiving sensor data from a plurality of sensors of an item of equipment, wherein the plurality of sensors is detecting a physical condition at a serviceable location within the item of equipment, and wherein the item of equipment is active during run-time operation outside of a service procedure; and
based on determining that the received sensor data exceeds the threshold value, requesting performance of the service procedure by the equipment servicer.

6. The method of claim 1, wherein undergoing a service procedure comprises performing, by the equipment servicer, maintenance on the item of equipment.

* * * * *